(12) United States Patent
Chernis et al.

(10) Patent No.: US 10,832,164 B2
(45) Date of Patent: *Nov. 10, 2020

(54) GENERATING STREAMING ANALYTICS APPLICATIONS USING A GLOSSARY

(71) Applicant: International Business Machines Corporation, Armonk, NY (US)

(72) Inventors: Evgeny Chernis, Jerusalem (IL); Leonid Gorelik, Petach Tikva (IL); Alexander Pyasik, Maaleh-Adumim (IL); Anand Ranganathan, Stamford, CT (US); Dmitry Shusterman, Jerusalem (IL); Yifat Yulevich, Bazra (IL)

(73) Assignee: International Business Machines Corporation, Armonk, NY (US)

( * ) Notice: Subject to any disclaimer, the term of this patent is extended or adjusted under 35 U.S.C. 154(b) by 1014 days.

This patent is subject to a terminal disclaimer.

(21) Appl. No.: 15/366,608

(22) Filed: Dec. 1, 2016

(65) Prior Publication Data

US 2017/0169359 A1    Jun. 15, 2017

Related U.S. Application Data

(63) Continuation of application No. 14/963,597, filed on Dec. 9, 2015, now Pat. No. 9,542,655.

(51) Int. Cl.
*G06F 40/242* (2020.01)
*G06N 20/00* (2019.01)
(Continued)

(52) U.S. Cl.
CPC ............ *G06N 20/00* (2019.01); *G06F 16/80* (2019.01); *G06F 40/242* (2020.01); *G06N 5/022* (2013.01)

(58) Field of Classification Search
None
See application file for complete search history.

(56) References Cited

U.S. PATENT DOCUMENTS

| 7,860,815 B1 | 12/2010 | Tangirala |
| 7,882,485 B2 | 2/2011 | Feblowitz et al. |

(Continued)

FOREIGN PATENT DOCUMENTS

| CN | 101218566 A | 7/2008 |
| EP | 2081118 A2 | 7/2009 |

(Continued)

OTHER PUBLICATIONS

Golding et al. "Improving accuracy by combining rule-based and case-based reasoning". AI 87, 1996, pp. 215-254.*

(Continued)

*Primary Examiner* — Li Wu Chang
(74) *Attorney, Agent, or Firm* — Richard Wilhelm; SVL IPLaw

(57) ABSTRACT

Examples of techniques for generating streaming analytics applications are described herein. An example computer-implemented method includes receiving, via a processor, subject matter requirements in a semi-structured format. The method includes classifying, via the processor, the subject matter requirements based on a predefined taxonomy. The method includes extracting, via the processor, a list of entities from the subject matter requirements based on grammar. The method includes generating a solution based on a glossary and the list of extracted entities. The method includes generating, via the processor, a streaming analytics application based on the solution.

19 Claims, 11 Drawing Sheets

(51) Int. Cl.
*G06F 16/80* (2019.01)
*G06N 5/02* (2006.01)

(56) References Cited

U.S. PATENT DOCUMENTS

| | | | |
|---|---|---|---|
| 7,899,861 B2 | 3/2011 | Feblowitz et al. | |
| 8,098,248 B2 | 1/2012 | Feblowitz et al. | |
| 8,141,085 B2 | 3/2012 | Grabarnik et al. | |
| 8,266,519 B2 | 9/2012 | Verma et al. | |
| 8,271,870 B2 | 9/2012 | Verma et al. | |
| 8,307,372 B2 | 11/2012 | Feblowitz et al. | |
| 8,370,812 B2 | 2/2013 | Feblowitz et al. | |
| 8,391,614 B2 | 3/2013 | Ravid et al. | |
| 8,412,516 B2 | 4/2013 | Verma et al. | |
| 8,442,985 B2 | 5/2013 | Verma et al. | |
| 8,447,801 B1 | 5/2013 | Roche et al. | |
| 8,566,731 B2 | 10/2013 | Subramanian et al. | |
| 8,671,101 B2 | 3/2014 | Verma et al. | |
| 8,677,313 B2 | 3/2014 | Sharma et al. | |
| 8,843,819 B2 | 9/2014 | Verma et al. | |
| 8,898,624 B2 | 11/2014 | Bouillet et al. | |
| 9,052,711 B2 * | 6/2015 | Schneider | G05B 23/0262 |
| 2003/0233631 A1 | 12/2003 | Curry et al. | |
| 2007/0261041 A1 | 11/2007 | Amini et al. | |
| 2008/0091690 A1 | 4/2008 | Ellersick et al. | |
| 2008/0235691 A1 | 9/2008 | Anderson et al. | |
| 2008/0243451 A1 | 10/2008 | Feblowitz et al. | |
| 2008/0244540 A1 | 10/2008 | Feblowitz et al. | |
| 2009/0185500 A1 | 7/2009 | Mower et al. | |
| 2010/0036691 A1 | 2/2010 | Bouldin et al. | |
| 2010/0150453 A1 | 6/2010 | Ravid et al. | |
| 2011/0029587 A1 | 2/2011 | Fujii | |
| 2012/0011082 A1 | 1/2012 | Apte et al. | |
| 2013/0138421 A1 | 5/2013 | Moulder | |
| 2014/0046942 A1 | 2/2014 | Ravid | |
| 2014/0068428 A1 | 3/2014 | Puppin | |

FOREIGN PATENT DOCUMENTS

| | | |
|---|---|---|
| EP | 2296094 A1 | 3/2011 |
| WO | 2002057916 A2 | 7/2002 |
| WO | 2007086059 A2 | 8/2007 |
| WO | 2014039286 A1 | 3/2014 |

OTHER PUBLICATIONS

PCT International Search Report and Written Opinion of the International Searching Authority, dated Mar. 21, 2017, 12 pages.

"Create and deploy custom entity extractors in SharePoint Server 2013" (Dec. 18, 2013), available at https://technet.microsoft.com/en-us/library/jj219480%28v=office.15%29.aspx.

"PHP Table Entity Code Generator v.1.0" (Apr. 5, 2012), available at http://www.winsite.com/Development/IDEs-Coding-Utilities/PHP-Table-Entity-Code-Generator/.

"Proof of Concept for a Glossary-Driven Website User Interface", available at http://www.databaseanswers.org/glossary_driven_user_interface.htm (last visited on Dec. 7, 2015).

Rocha et al. "A case-based reasoning system to support the global software development", KES, Procedia Computer Science 35, 2014, pp. 194-202.

Zhang et al. "Intelligent Selection of Instances for Prediction Functions in Lazy Learning Algorithms", Al Review, 1997, pp. 175-191.

Burke et al. "Structured cases in cases-based reasoning—re-using and adapting cases for time-tabling problems", Knowledge Based Systems 13, 2000. pp. 159-165.

Aha "The omnipresence of case-based reasoning in science and application", KBS 11, 1998, pp. 261-273.

List of IBM Patents or Patent Applications Treated as Related, Dec. 1, 2016.

* cited by examiner

GENERATING STREAMING ANALYTICS APPLICATIONS USING A GLOSSARY

CROSS-REFERENCE TO RELATED APPLICATIONS

This application is a continuation of U.S. patent application Ser. No. 14/963,597, filed on Dec. 9, 2015, and entitled "Generating Streaming Analytics Applications Using a Glossary," the disclosure of which is incorporated herein by reference in its entirety for all purposes.

BACKGROUND

The present techniques relate to the generation of streaming applications. More specifically, the techniques relate to generating streaming analytics applications using a glossary.

SUMMARY

According to an embodiment described herein, a system can include a processor to receive subject matter requirements in a semi-structured format. The processor can also further classify the subject matter requirements based on a predefined taxonomy. The processor can also extract a list of entities from the subject matter requirements based on grammar. The processor can further also generate a solution based on a glossary. The processor, to generate the solution, can further detect an appropriate training data set in a model repository based on the classifications and the extracted entities. The processor can also generate a model based on the training data set. The processor can also further generate a streaming analytics application based on the solution. The streaming analytics application can include a model.

According to another embodiment described herein, a method can include receiving, via a processor, subject matter requirements in a semi-structured format. The method can further include classifying, via the processor, the subject matter requirements based on a predefined taxonomy. The method can also further include extracting, via the processor, a list of entities from the subject matter requirements based on grammar. The method can also include generating, via the processor, a solution based on a glossary and the list of extracted entities. The method can further include generating, via the processor, a streaming analytics application based on the solution.

According to another embodiment described herein, a computer program product for generating streaming analytics applications can include computer-readable storage medium having program code embodied therewith. The computer readable storage medium is not a transitory signal per se. The program code is executable by a processor to cause the processor to receive subject matter requirements in a semi-structured format. The program code can also cause the processor to classify the subject matter requirements based on a predefined taxonomy. The program code can also cause the processor to extract a list of entities from the subject matter requirements based on grammar. The program code can also cause the processor to detect an appropriate training data set in a model repository based on the classifications and the extracted entities. The program code can also cause the processor to generate a model based on the training data set. The program code can also cause the processor to further generate a streaming analytics application comprising the mining component.

DETAILED DESCRIPTION

Figure 1:
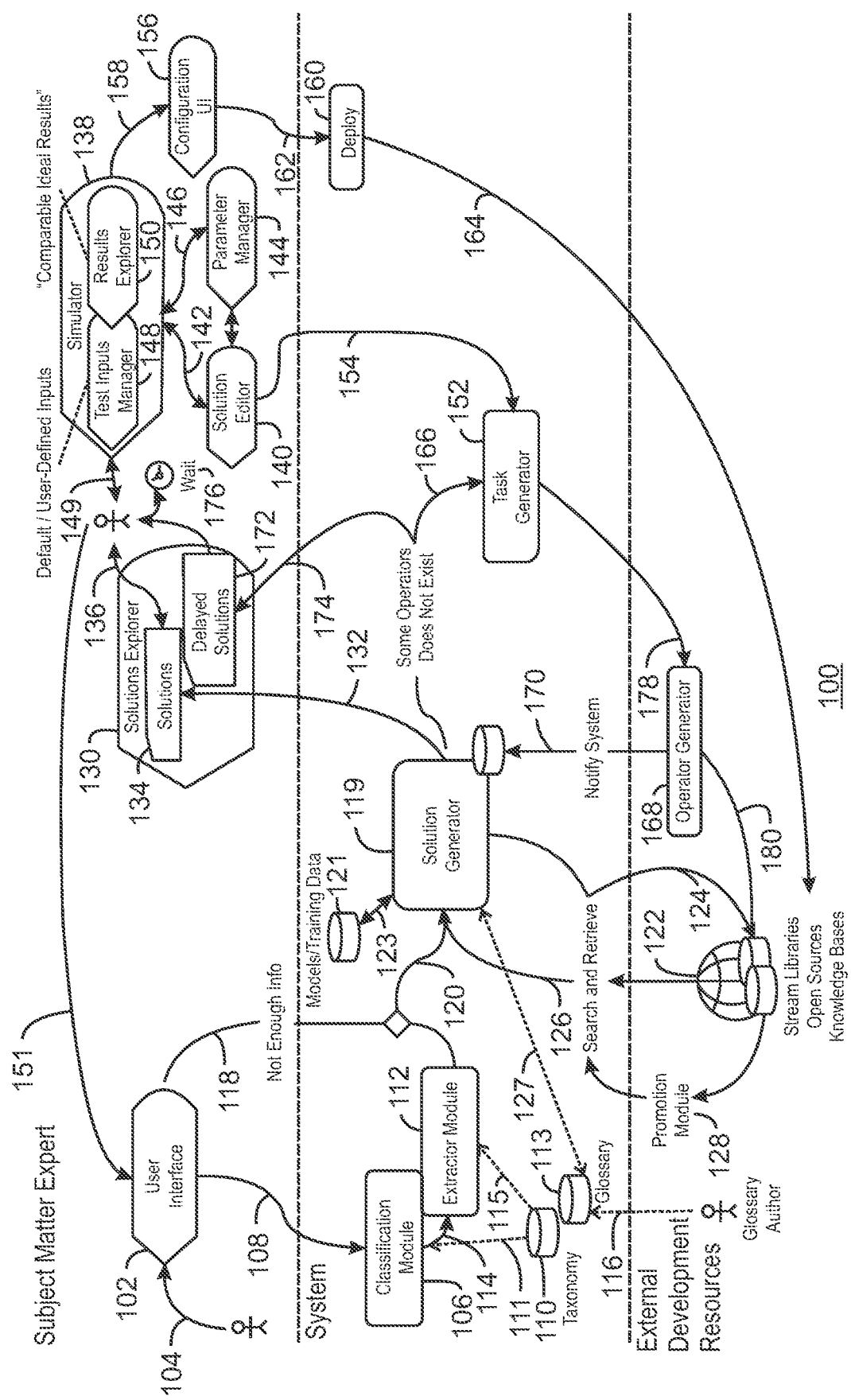
FIG. 1 is a block diagram of an example system for generating streaming applications using a glossary.

Stream Computing Platforms are high-performance platforms that can continuously analyze massive volumes of data at rates up to petabytes per day in addition to performing complex analytics of heterogeneous data types. For example, the heterogeneous data types can include text, images, audio, voice, VoIP, video, web traffic, email, GPS data, financial transaction data, satellite data, and sensor data, among other types of data. The development process on Stream Computing Platforms utilizes high programming skills, knowledge and deep platform understanding. However, subject matter experts that may be the main stakeholders of the streaming applications have no streaming application development skills, but may rather have deep subject matter domain expertise. Thus, Stream Computing Platforms may include at least two roles in a project lifecycle. A subject matter expert may define functional and non-functional application requirements and may be responsible for application acceptance testing by simulation of complex test cases. For example, the functional application requirements can define functions of a system and its components, such as receiving a particular set of inputs or outputs. Non-functional application requirements can specify criteria that can be used to judge the operation of a system, such as performance rates. A streaming application developer may be trained to understand subject matter constraints and transform them to a streaming application during continuous and tight communication with application stakeholders. In addition, the two roles may use different vocabularies and the subject matter expert may not be aware of streaming application development specifics. Furthermore, processing large amounts of data may include taking additional factors into consideration when designing and development of streaming applications.

According to embodiments of the present disclosure, a system can generate streaming analytics applications based on a glossary. For example, an analytics model may be selected from a repository or can be generated based on subject matter constraints using a semi-structured language.

For example, the system can receive the subject matter constraints in the semi-structured language and generate the streaming applications automatically and in real-time using a predefined glossary. In addition, the techniques include a simulation-based method for streaming analytics application testing and tuning. The method allows subject matter experts to rapidly generate, test and tune streaming analytics applications without manual coding and deep specific streaming platform knowledge. Moreover, the method is agnostic to specific streaming platform implementations. Thus, embodiments of the present disclosure allow any streaming platform to be used to generate streaming analytics applications automatically and in real-time.

In some scenarios, the techniques described herein may be implemented in a cloud computing environment. As discussed in more detail below in reference to at least FIGS. 7-9, a computing device configured to generate streaming applications may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With reference now to FIG. 1, an example computing device can generate streaming applications. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

With reference now to FIG. 1, a block diagram shows an example system for generation of streaming applications using a glossary. The example process flow is generally referred to by the reference number 100 and can be implemented using the computing device 800 of FIG. 8 below. FIG. 1 includes a user interface 102 that is shown receiving input from a subject matter expert (SME) as indicated by an arrow 104. The subject matter expert, as referred to herein, can include any suitable automated computer application or a user. The input can describe an expected behavior of a streaming application in a semi-structured format. For example, the format can be similar to the Gherkin format. The expected behavior can include functional behavior, expected hardware and software resources available for application execution, and non-functional aspects such as security, scalability, etc. For example, a semi-structured format may appear as:

Scenario 1: Network Traffic Anomaly Streaming Application

Given: live enterprise network traffic with rate of 200 Mb/second collected from a tapping server
When: anomaly is detected in HTTP traffic
Then: raise alarm Scenario 2: Earthquake Early Warning Streaming Application Given: sensor data from seismometers in mseed format that should be acquired in a rate of 100 events/sec
When: peak from single station has detected
Then: apply algorithm for earthquake epicenter detection and raise alarm with an epicenter coordinates In the example of FIG. 1, a classification module 106 can receive the subject matter input as indicated by an arrow 108. The classification module 106 can classify the subject matter input based on a predefined taxonomy of a store 110 as indicated by an arrow 111. The store 110 can be any suitable database or any other data storage system. In some examples, the classification can be a process of automatic classification by a pre-defined taxonomy of the semi-structured subject matter requirements. The classification module 106 can use supervised learning for bootstrapping. For example, supervised learning can include a process of analytics model generation from training data. The analytics model generation process may have an off-line nature. For example, the classification module 106 can first generate a model based on a training set with a limited size. Then the generated model can be deployed to a runtime environment. In some examples, the classification module 106 can use pre-defined training data to create initial bootstrap model for text classification. The classification module 106 can then improve the model by real-time learning via feedback. In addition, the classification module 106 can use real-time learning to improve performance and quality results. The classification module 106 can also employ sophisticated natural language processing and machine learning techniques. For example, the classification module 106 may classify the Scenario 1 above as a "Network Analytics Application."

Still referring to FIG. 1, an extractor module 112 can receive the classification as indicated by an arrow 114. The extractor module 112 can extract a list of entities from the classification generated by the classification module 106 based on a taxonomy 110. The system 100 can also include a glossary 113 that may have been predefined by a glossary author. For example, an initial entity extract phase can be based on the taxonomy 110 as indicated by an arrow 115. For example, the glossary may have been predefined by a glossary author as indicated by arrow 116. In some examples, the predefined glossary 113 may include language used by a specific company or organization in dealing with particular a subject matter. The extractor module 112 can use the taxonomy 110 to connect correlated terms and concepts in a graph to create entities that can be mapped to solution components. In some examples, the taxonomy 110 and/or glossary 113 can also be tuned by a System Learning component for a given subject matter category. The extractor module 112 can utilize entity relationships defined in a taxonomy 110 for extraction of additional entities. The extractor module 112 output can contain an enriched list of entities. For example, the extracted entities can be similar to the example extracted entities 200 and 300 of FIGS. 2-3 discussed in greater detail below. In some examples, the extractor module 112 can detect that not enough information exists in the taxonomy 110 for a successful extraction. The extractor module 112 can send a notification of missing information to the user interface 102 as indicated by an arrow 118. In some examples, an SME can provide the missing information via the user interface 102.

The system 100 further includes a solution generator module 119 that can receive the entity list from the extractor module 112 as indicated by an arrow 120. The system 100 further includes a model/training data repository 121 including models and/or training data used to generate one or more solutions as indicated by an arrow 123. A solution, as used herein, refers to a candidate application that can be used. For example, an appropriate model can be extracted from the model repository 121 based on the enriched entities from the extractor module 112 and the categories from the classification module 106. The solution generator 119 can generate solutions by iteratively mapping the enriched entities to models using a knowledge database 122 as indicated by an arrow 124. For example, the knowledge database 122 may include Stream Libraries and Open Source Knowledge Bases holding the solutions and solution components that were created and uploaded by any development teams worldwide with respective meta-data. The knowledge database 122 can be dynamic. For example, new toolkits or solutions can be immediately available for streaming application once added to the knowledge database 122. In some examples, published toolkits or solutions can be automatically added to the knowledge database 122 for use in generating streaming applications. In some examples, the knowledge database 122 can include open source resources. For example, solutions from open source communities can be automatically added to the knowledge database 122. The solution generator module 119 can manage these knowledge bases. In some examples, the solution generator module 119 can use mapping to iteratively narrow a search scope and return a set of solutions that match given requirements as indicated by an arrow 126. For example, the solution generator module 119 can score potential solutions based on how close they match the requirements and a set of solutions with a higher score may be returned as discussed with regards to the solutions explorer 130 below. The solution generator 119 can map the entities to one or more stream solution components as described in greater detail with respect to the example mappings 400-500 of FIGS. 4-5. In some examples, the solution generator module 119 can use the glossary 113 as indicated by an arrow 127. The glossary 113 can include a plurality of application conceptual graphs. For example, a conceptual graph can contain a conceptual real-time mining application structure with inter-category connections and properties. The conceptual graphs enable the solution generator 119 to be effective. In addition, when the solution generator 119 creates a streaming application that is approved by a customer, the solution generator 119 can send feedback to the glossary as indicated by arrow 127. The feedback can contain new properties and inter-component connections. In some examples, the search can be accompanied by user feedback. For example, the user feedback can include scoring of the mapping results. For example, a user may give a highest score for the best solution. In some examples, when a specific entities pattern cannot be mapped to any available solution even after user feedback, the solution generator module 119 can create a task requirement to develop a new sufficient operator and notify the SME. The mappings for Scenarios 1 and 2 above are described with respect to FIGS. 4 and 5 below, respectively.

Still referring to FIG. 1, in some examples, a promotion module 128 can guide solution component selection based on input from other experts. For example, the promotion module 128 can add highly weighted indexes to solution components that other experts may want to promote, thus guiding the solution generator module 119 to give them higher scores.

The system 100 further includes a solutions explorer module 130. For example, the solutions explorer module 130 can be a user interface that can be used to manage solutions 134 received from the solution generator module 119 as indicated by an arrow 132. For example, each of the solutions 134 can include an analytics model that can be used to generate a streaming analytics application including the analytics model. The solutions explorer module 130 can also be used to explore solution graphs and related information as indicated by an arrow 136. The solutions explorer module 130 can also be used to invoke a solution simulator 138, a solution editor 140 as indicated by an arrow 142, and a parameter manager 144 as indicated by an arrow 146.

The solution simulator 138 can execute solutions with default or user-defined input values and test the results. For example, the solution simulator 138 can receive uploaded "gold" test results at a test inputs manager 148 as indicated by arrow 149. For example, the "gold" test results can include expected test results. The solution simulator 138 can also generate comparative statistics with match metrics. The match metrics can be displayed for the user via a results explorer 150. In some examples, if the results meet the predefined requirements, then the solution can be deployed into a production environment as discussed below. If the results do not meet the expectations of the user, then the solution may be improved or the requirements may be redefined at user interface 102 as indicated by an arrow 151. In some examples, the parameter manager 144 may be used to fine tune streaming analytics applications by configuring parameters as indicated by an arrow 146. For example, if a streaming analytics application runs a specific algorithm, the parameter manager 144 can enable tuning of the algorithm for best performance and results. In some examples, the solution editor 140 may be used to edit solutions as indicated by an arrow 142. For example, the solutions can be edited with or without the help of an external developer. Thus, the techniques enable a subject matter expert to edit solutions without the help of external developers. For example, the SME can be presented with a list of alternative solutions to use. In some examples, a subject matter expert may create a task requirement to develop a new solution component as indicated by an arrow 154. For example, the task requirement can be sent to a task generation module 152 as indicated by an arrow 154. A developer can then build operators as described below.

Still referring to FIG. 1, a configuration user interface 156 can enable an SME to tune a streaming application based on results analysis. For example, the results analysis may have been generated by results explorer 150 and sent to the configuration user interface 156 as indicated by an arrow 158. In some examples, the tuning may be functional. For example, the tuning may include a request to add a new type of data injector. A data injector can include a live feeder for capturing live traffic from a network card, a file feeder for reading data from files, or a database feeder for reading data from databases, among other types of data injectors. In some examples, the tuning may be non-functional. For example, the tuning may include a request to support higher data volume and/or velocity. The configuration user interface 156 may also be used to send out a solution for deployment 160 as indicated by an arrow 162. In some examples, the deployed solution may also be sent to the knowledge database 122 as indicated by an arrow 164. For example, the solution explorer 130 may include the deployed solution in the list of solutions 134 for streaming application generation.

As described above, the task generator module 152 can automatically generate new development tasks for the solution explorer 130 in the case where the solution generator module 119 fails to map a requirement entity onto an existing solution in the knowledge database 122. In some examples, the solution editor 140 can also use the task generator module 152 to update an auto-generated solution during simulation-based testing. For example, a SME can use the solution editor 142 to manually update the auto-generated solution as indicated by an arrow 154. In some examples, the solution generator 119 can cause the task generator 152 to generate new development tasks as indicated by an arrow 166. For example, the solution generator module 119 may detect that one or more operators do not exist. The task generator module 152 can cause an operator generator 168 to generate a description of the missing operators. For example, the required inputs and outputs of the missing operators can be described. The operator generator 168 can notify the system of the new operators by sending the new operators to the solution generator 119 as indicated by an arrow 170. The solution generator module 119 can then use the generated operators to generate additional delayed solutions 172 as indicated by an arrow 174. In some examples, there may be a wait time 176 before the solutions 134 are simulated. For example, there may be a wait time 176 if the solution mapper fails to find an appropriate injector (feeder) to use for a customer specific input format parsing. In some examples, a developer can review descriptions of missing operators provided by the task generator 152 and develop new operators as indicated by an arrow 178. The new operators can be added to the knowledge database 122 as indicated by an arrow 180.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, additional resource servers, etc.).

Figure 2:
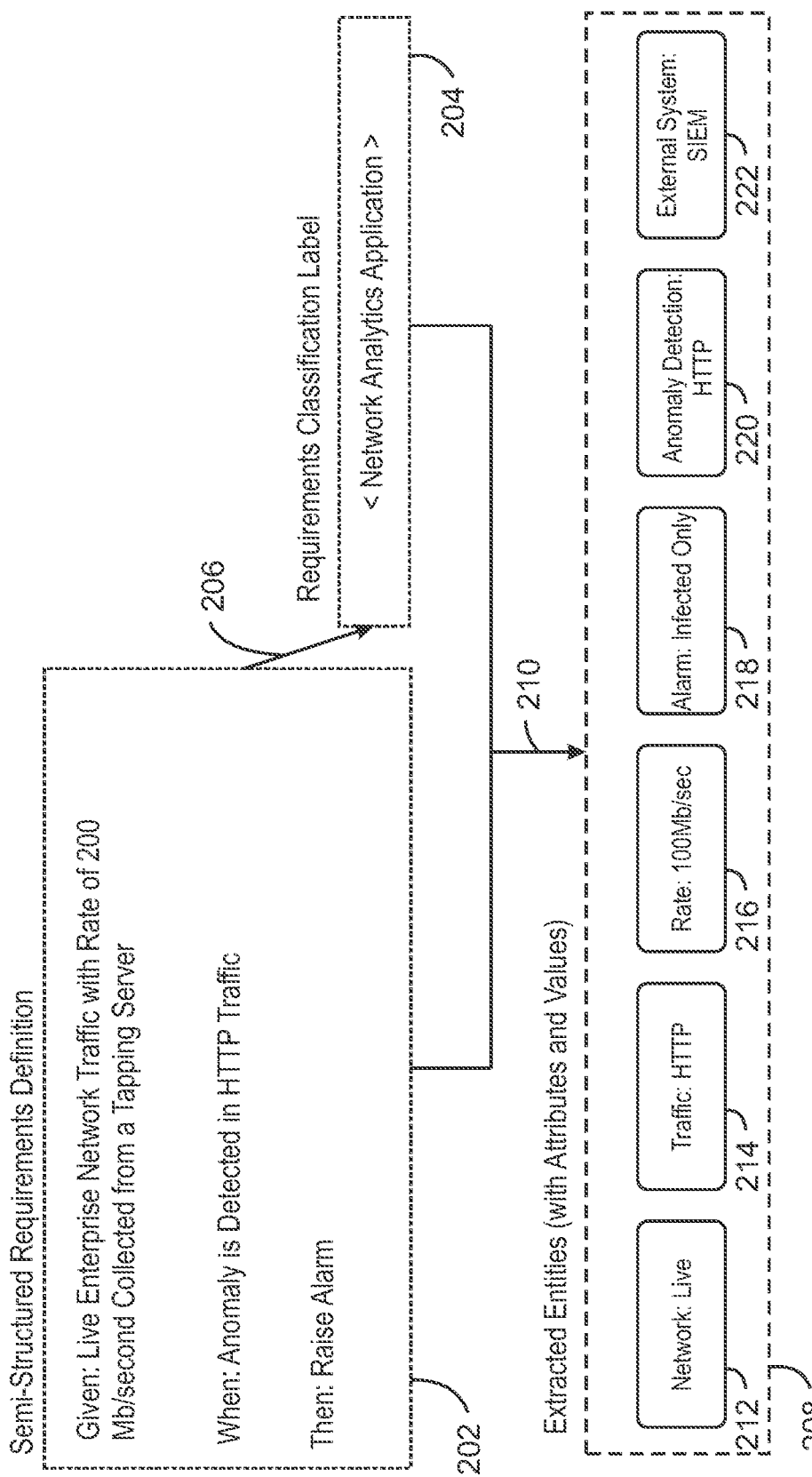
FIG. 2 is a block diagram of an example process of entity extraction for a streaming application that can raise alarms for detected anomalies in HTTP traffic.

FIG. 2 is a block diagram of an example process of entity extraction for a streaming application that can raise alarms for detected anomalies in HTTP traffic. The example process is generally referred to by the reference number 200 and can be implemented using the computing device 800 of FIG. 8. FIG. 2 includes a semi-structure requirements definition 202, a requirements classification label 204, and extracted entities 208. The extracted entities 208 include a network entity 212, a traffic entity 214, a rate entity 216, an alarm entity 218, an anomaly detection entity 220, and an external system entity 222.

In the example process 200, the semi-structured requirements definition 202 includes a "given" requirement with a value of "live enterprise network traffic with rate of 200 Mb/second collected from a tapping server." The semi-structured requirements definition 202 further includes a "when" requirement with a value of "anomaly is detected in HTTP traffic." The semi-structured requirements definition 202 further includes a "then" requirement with a value of "raise alarm." As indicated by an arrow 206, the semi-structured requirements definition 202 can be classified by a computing device to produce a requirements classification label 204 with a value of "Network Analytics Application." For example, the computing device can use a taxonomy to determine the value of the requirements classification label 204 based on the provided semi-structured requirements definition 202. The semi-structured requirements definition 202 may have been provided by an SME.

As indicated by an arrow 210, the computing device can extract the extracted entities 208 from the semi-structured requirements definition 202 based on the requirements classification label 204 and a glossary (not shown). Each extracted entity can have an attribute and a value. In the example mapping 200 of FIG. 2, the network entity 212 has an attribute with a value of "live." The traffic entity 214 has an attribute with a value of "HTTP." The rate entity 216 has an attribute with a value of 100 Mb/second. The alarm entity 218 has an attribute with a value of "infected only." The anomaly detection entity 220 has an attribute with a value of "HTTP." The external system entity 222 has an attribute with a value of "SIEM," which indicates a "Security Information and Event Management" system. Each extracted entity can then be mapped to one or more solution components as described in detail below with respect to FIG. 4.

It is to be understood that the block diagram of FIG. 2 is not intended to indicate that the process 200 is to include all of the components shown in FIG. 2. Rather, the process 200 can include fewer or additional components not illustrated in FIG. 2 (e.g., additional extracted entities, values, etc.).

Figure 3:
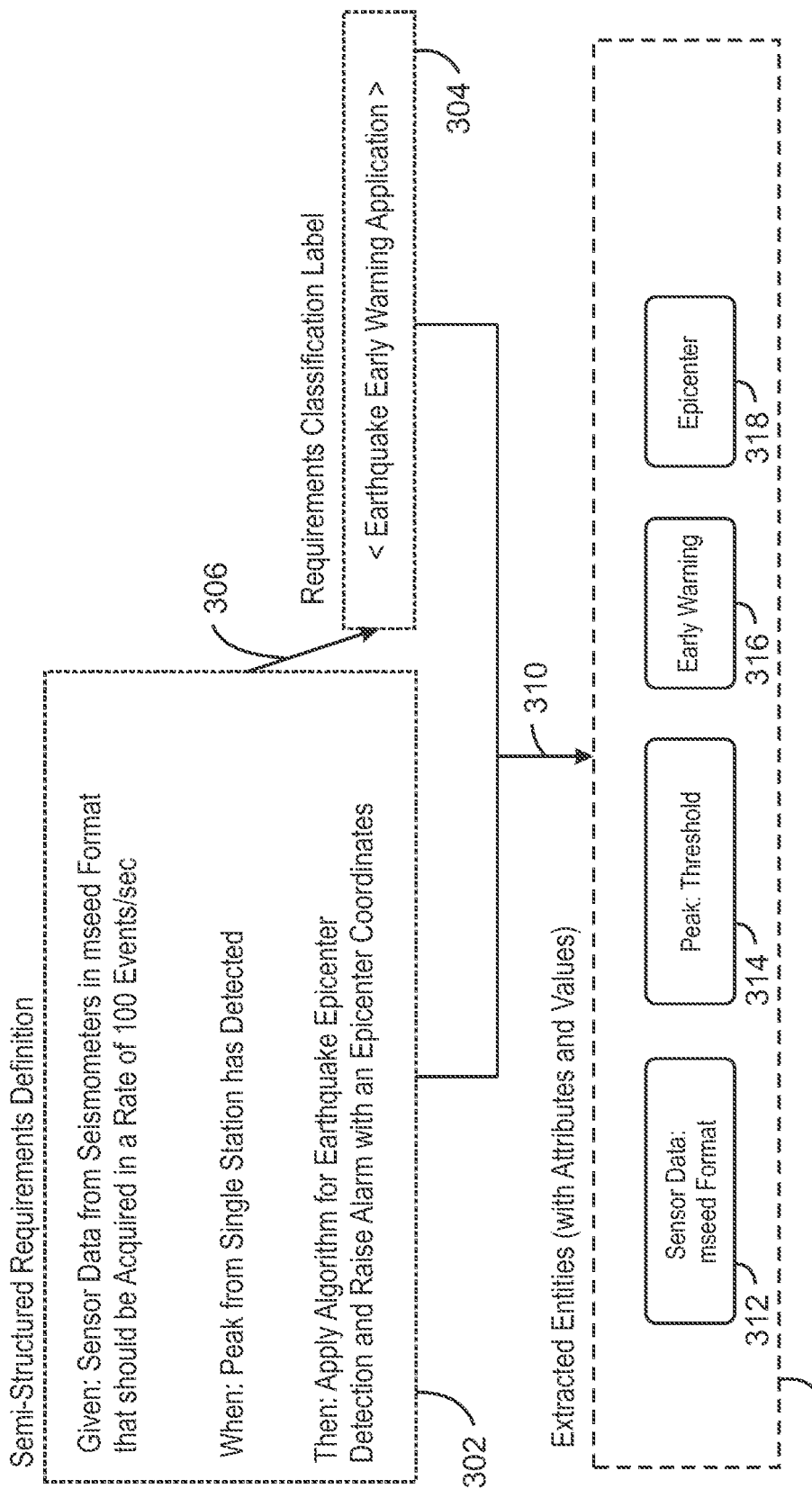
FIG. 3 is a block diagram of an example process of entity extraction for a streaming application that can detect epicenters of earthquakes.

FIG. 3 is a block diagram of an example process of entity extraction for a streaming application that can detect epicenters of earthquakes. For example, the streaming application can detect epicenters in real-time and provide early warning about potentially dangerous locations. The example process is generally referred to by the reference number 300 and can be implemented using the computing device 800 of FIG. 8. FIG. 3 includes a semi-structure requirements definition 302, a requirements classification label 304, and extracted entities 308. The extracted entities 308 include a sensor data entity 312, a peak entity 314, an early warning entity 316, and an epicenter entity 318.

In the example process 300, the semi-structured requirements definition 302 includes a "given" requirement with a value of "sensor data from seismometers in mseed format that should be acquired in a rate of 100 events/second." The semi-structured requirements definition 302 further includes a "when" requirement with a value of "peak from single station has detected." The semi-structured requirements definition 302 also includes a "then" requirement with a value of "apply algorithm for earthquake epicenter detection and raise alarm with epicenter coordinates." As indicated by an arrow 306, the semi-structured requirements definition 302 can be classified by a computing device to produce a requirements classification label 304 with a value of "Earthquake Early Warning Application." For example, the computing device can use a taxonomy to determine the value of the requirements classification label 304 based on the provided semi-structured requirements definition 302. The semi-structured requirements definition 302 may have been provided by an SME.

As indicated by an arrow 310, the computing device can extract the extracted entities 308 from the semi-structured requirements definition 302 based on the requirements classification label 304 and a glossary (not shown). Each extracted entity can have an attribute and a value. In the example mapping 300 of FIG. 3, the sensor data entity 312 includes a value of "mseed format." The peak entity 314 includes a value of "threshold." The early warning entity 316 entity and the epicenter 318 entity do not have any attribute values. Each extracted entity can then be mapped to one or more solution components as described in detail below with respect to FIG. 5.

It is to be understood that the block diagram of FIG. 3 is not intended to indicate that the process 300 is to include all of the components shown in FIG. 3. Rather, the process 300 can include fewer or additional components not illustrated in FIG. 3 (e.g., additional extracted entities, values, etc.).

Figure 4:
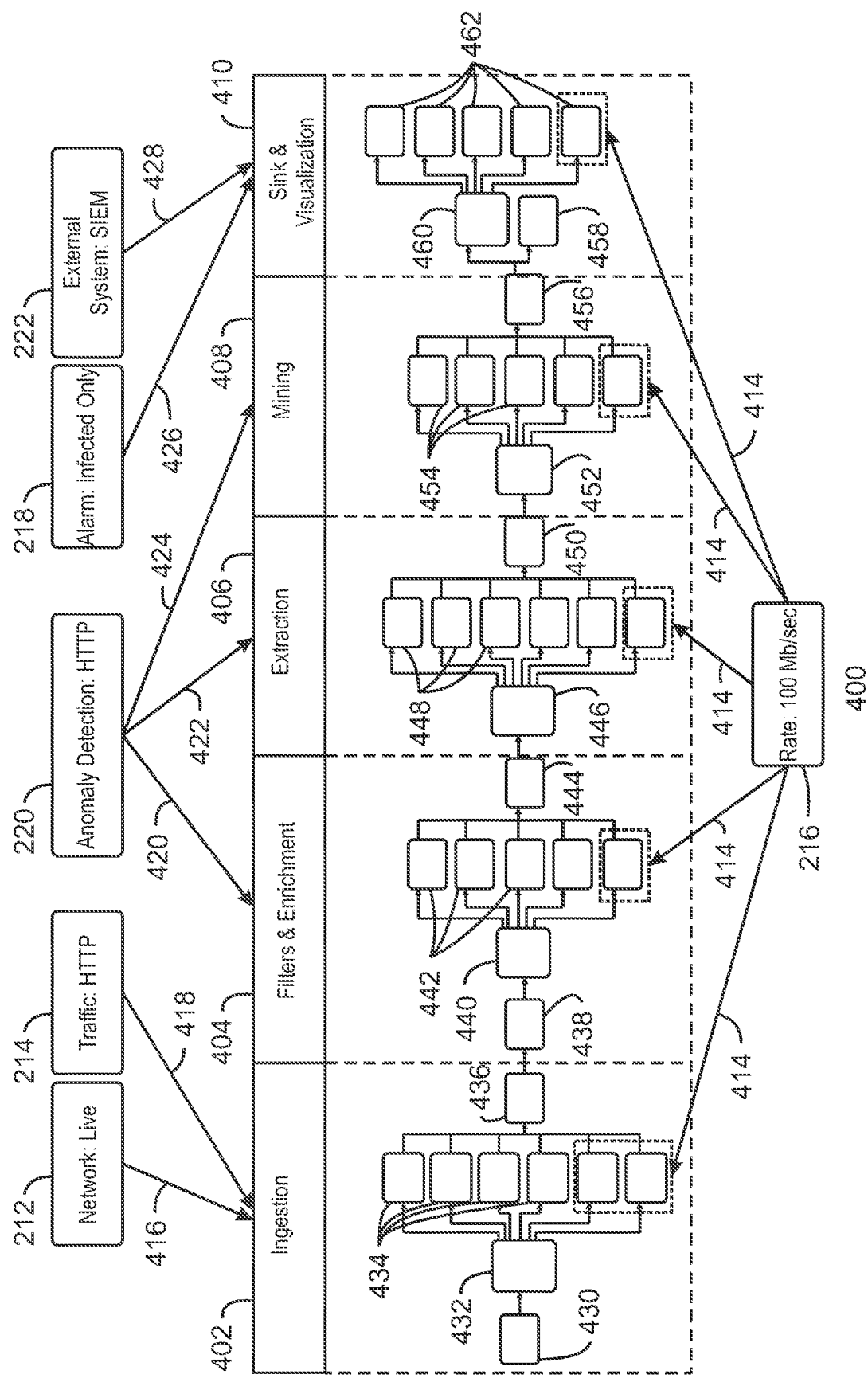
FIG. 4 is a block diagram of an example mapping for generating a streaming application that can raise alarms for detected anomalies in HTTP traffic.

FIG. 4 is a block diagram of an example mapping for generating a streaming application that can raise alarms for detected anomalies in HTTP traffic. The example mapping is generally referred to by the reference number 400 and can be implemented using the computing device 800 of FIG. 8. FIG. 4 includes solution components including an ingestion component 402, a filters and enrichment component 404, an extraction component 406, a mining component 408, and a sink and visualization component 410. The example mapping 400 also includes the extracted network entity 212, traffic entity 214, rate entity 216, anomaly detection entity 220, alarm entity 218, and external system entity 222 extracted in FIG. 2 above. The entities are shown mapped to the components via arrows 414-428.

The ingestion component 402 can capture data from a network card and parse it effectively using parallel processing. In some examples, each box may represent a functional unit that can be run on a separate CPU. Thus, the techniques enable a distributed computing application to be generated. For example, the columns of boxes in each of the solution components 402-410 indicate parallel processing to be performed to meet the 100 Mb/second rate 216 requirement that is mapped to each component as indicated by arrows 414. A capture unit 430 can capture the data and send the data to a sorting unit 432. The detector units 434 can detect HTTP traffic from the captured data. For example, a plurality of detector units 434 can be used to enable a rate of 100 Mb/sec of captured data processing. An output unit 436 can collect data from the detector units 434 and output the detected HTTP traffic to the filters and enrichment component 404.

The filters and enrichment component 404, the extraction component 406, and the mining component 408 can perform anomaly detection. For example, the filters and enrichment component 404 can include a receiver unit 438 that can send the received HTTP traffic to the filter unit 440. The filter unit 440 can send the filtered data to the enrichment units 442. The enrichment units 442 can enrich the data at a speed of 100 MB/sec. The output unit 444 can send the enriched data to the extraction component 406.

The extraction component can include a receiver unit 446 and a plurality of extraction units 448 that can extract data at a rate of 100 Mb/second. The extraction component 406 can also include an output unit 450 that can send the extract information to the mining component 408.

The mining component 408 includes a receiver unit 452 and a plurality of mining units 454 capable of classifying information at a rate of 100 Mb/sec. The mining component 408 also includes an output unit 456 that can send the mined information to the sink and visualization component 410. For example, the mining component may correspond to an analytics model. The analytics model may have been retrieved from a model repository. In some examples, the analytics model may have been generated based on a training data set.

The sink and visualization component 410 includes a pair of receiving units 458, 460 that can receive the mined information. The receiver unit 460 can send the mined information to the visualization units 462 that are capable of operating at a rate of 100 Mb/sec. The sink and visualization component 410 can cause an alarm to set off if the mined information is detected as being infected.

Thus, a plurality of functional components 402-410 are mapped to a plurality of requirements 212, 214, 216, 218, and 222. It is to be understood that the block diagram of FIG. 4 is not intended to indicate that the example mapping 400 is to include all of the components shown in FIG. 4. Rather, the example mapping 400 can include fewer or additional components not illustrated in FIG. 4 (e.g., additional extracted entities, or solution components, units, etc.).

Figure 5:
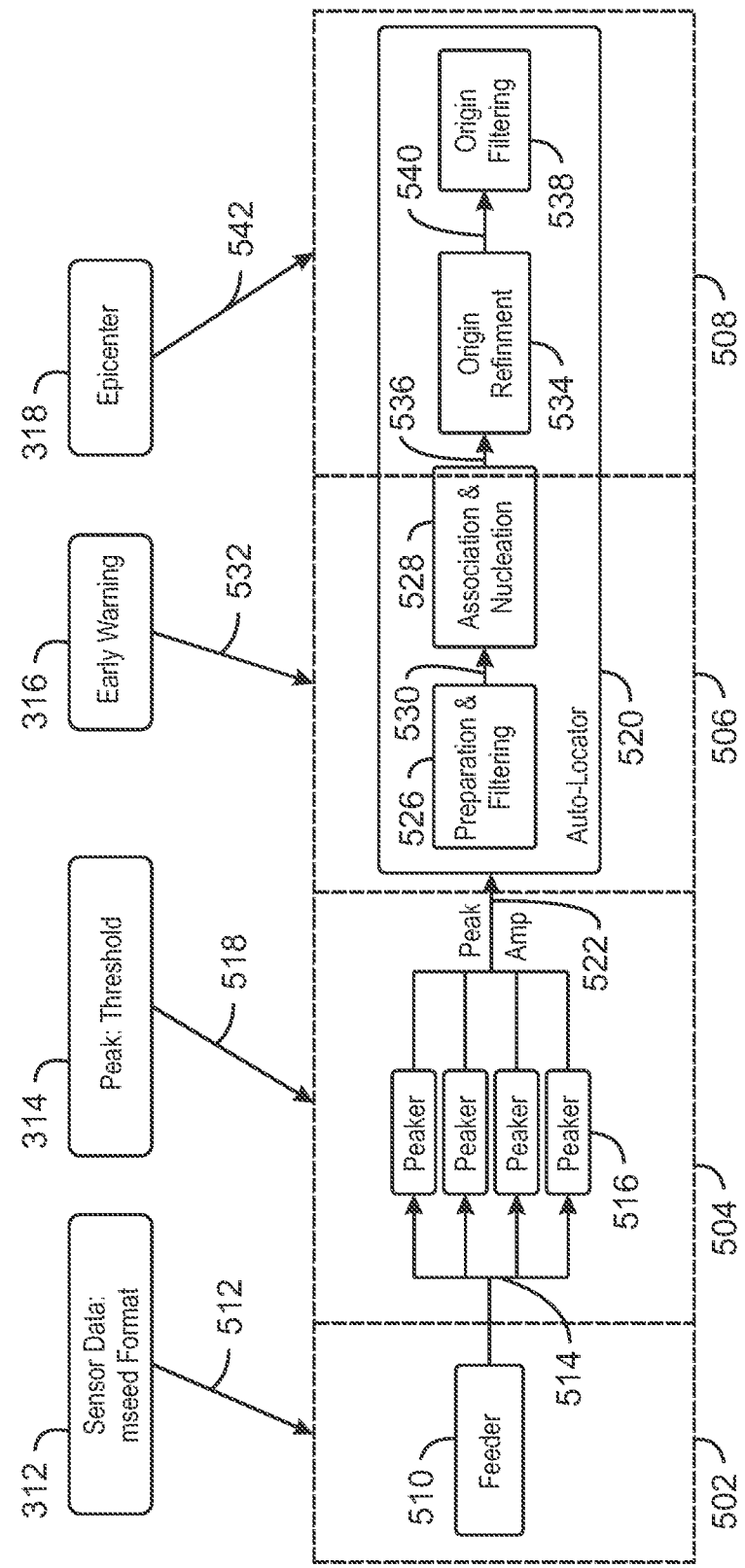
FIG. 5 is a block diagram of an example mapping for generating a streaming application that can detect epicenters of earthquakes.

FIG. 5 is a block diagram of an example mapping for generating a streaming application that can detect epicenters of earthquakes. The example mapping is generally referred to by the reference number 500 and can be implemented using the computing device 800 of FIG. 8. FIG. 5 includes solution components including an ingestion component 502, a peak detector component 504, a filters and enrichment component 506, and a refinement and filtering component 508. The example mapping 500 also includes the sensor data entity 312, the peak entity 314, the early warning entity 316, and the epicenter entity 318, extracted in FIG. 3 above. The entities are shown mapped to the components via arrows 512, 518, 532, 542.

Feeder 510 can transmit sensor data to a peak detector 504 component. The peak detector component may include a plurality of peak detection units 516 and a detected peak output 522. The auto-locator component 520 may include a preparation and filtering component 526 and an association and nucleation component 528. For example, the preparation and filtering component 526 can prepare and filter the detected peak output 522 and send the filtered output to the association and nucleation module 528 as indicated by an arrow 530. The association and nucleation module can then generate early warnings of potential earthquakes. The auto-locator component 520 can further include an origin refinement component 534 to receive origin information from the association and nucleation component 528 as indicated by an arrow 536 and perform refinement on the origin information. The auto-location component 520 can also include an origin filtering component 538 that can receive the refined origin information from the origin refinement component 534 as indicated by an arrow 540 and determine an epicenter of an earthquake.

Thus, the four provided requirements 312, 314, 316, 318 can be mapped to the solution components associated with required functions for a streaming application.

It is to be understood that the block diagram of FIG. 5 is not intended to indicate that the example mapping 500 is to include all of the components shown in FIG. 5. Rather, the example mapping 500 can include fewer or additional components not illustrated in FIG. 5 (e.g., additional extracted entities, solution components, units, etc.).

Figure 6:
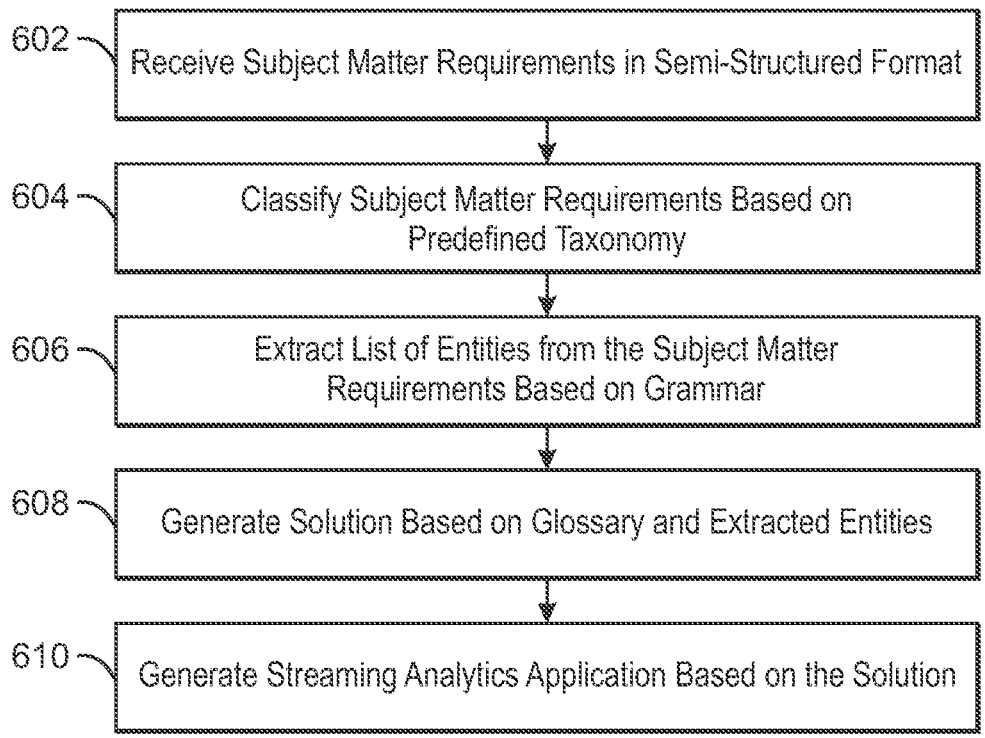
FIG. 6 is a process flow diagram of an example method that can generate streaming applications based on a glossary.

FIG. 6 is a process flow diagram of an example method that can generate streaming applications based on a glossary. The method 600 can be implemented with any suitable computing device, such as the computing device 800 of FIG. 8 and is described with reference to the system 100 of FIG. 1. For example, the method described below can be implemented by the system 100 of FIG. 1.

At block 602, the system receives subject matter requirements in semi-structured format. For example, the subject matter requirements can include a plurality of subject-matter constraints in a human-readable language. As discussed above, the constraints can include the subject matter requirements for a working streaming application.

At block 604, the system classifies subject matter requirements based on predefined taxonomy. For example, the taxonomy can include an organized structure of categories. The system can classify the subject matter requirements by detecting each subject matter requirement or a keyword associated with the subject matter requirement in the taxonomy and returning the associated category.

At block 606, the system extracts a list of entities based on grammar. For example, the entities can each include an attribute and a value as described with respect to FIGS. 2 and 3 above.

At block 608, the system generates a solution based on a glossary. For example, the solution can be generated according to the techniques described in FIG. 7 below. In some examples, the system can score solutions based on metadata comparisons and return a set of solutions with a higher score.

At block 610, the system generates a streaming analytics application based on the solution. For example, the mining component can be one of a plurality of components included in the streaming analytics application. In some examples, the streaming analytics application can be generated in real time. In some examples, the system can receive feedback from a subject matter expert and update the streaming analytics application based on the feedback. For example, the feedback can include additional or removed operators, parameters, solution components, etc. Thus, the system enables real-time generation of streaming analytics applications that can be modified. In some examples, the system can execute the streaming analytics application. The streaming analytics application can receive streaming analytics information and generate real-time output. For example, the output can be early warnings for earthquakes, epicenter locations, alarms indicating detected anomalies, among other kinds of output. In some examples, the system can receive feedback from a subject matter expert and update the streaming analytics application conceptual graph in the glossary based on the feedback. The streaming analytics application can also be updated accordingly.

The process flow diagram of FIG. 6 is not intended to indicate that the operations of the method 600 are to be executed in any particular order, or that all of the operations of the method 600 are to be included in every case.

Figure 7:
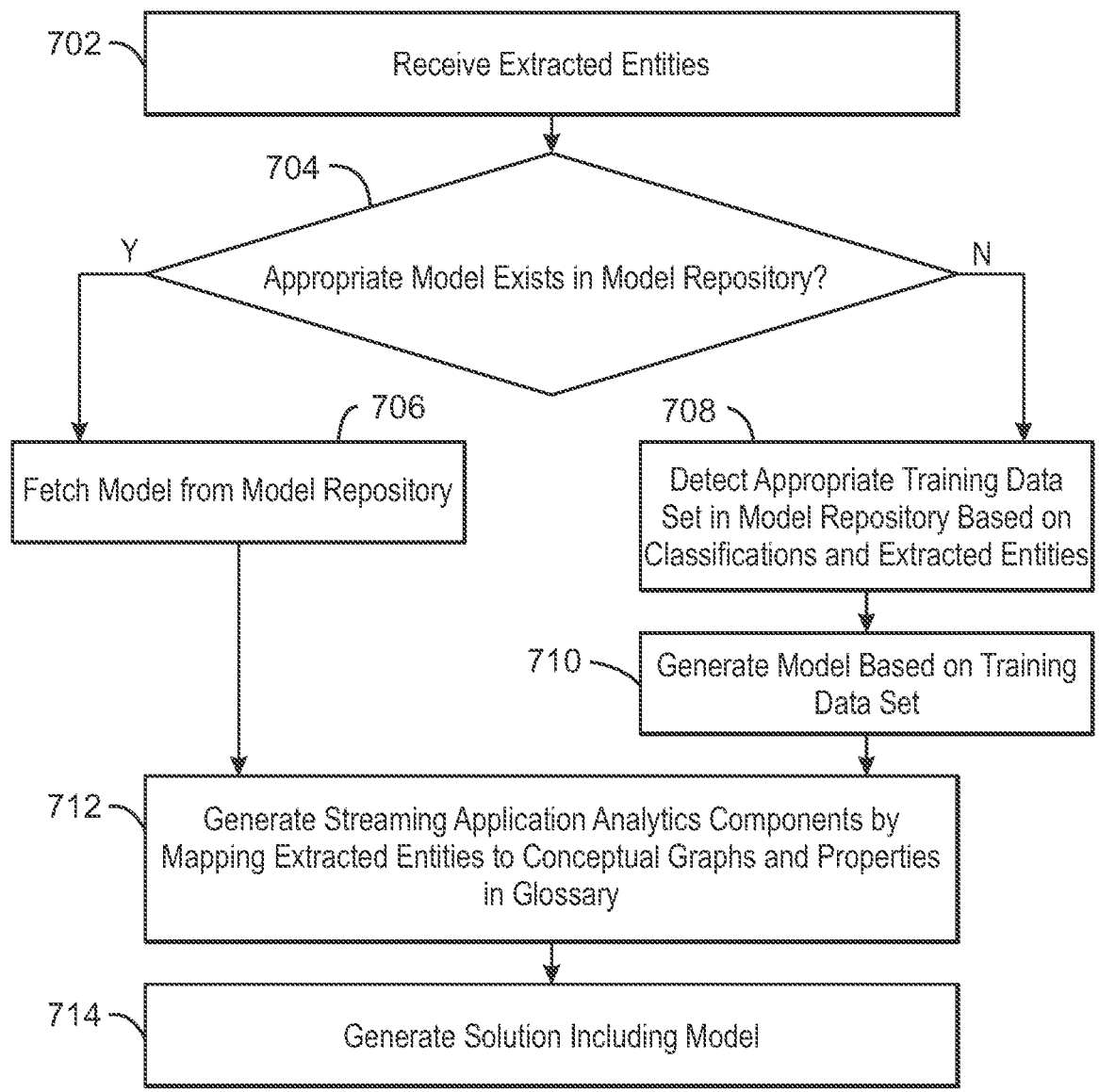
FIG. 7 is a process flow diagram of an example method that can generate a solution including a model.

FIG. 7 is a process flow diagram of an example method that can generate a solution including a model. The method 700 can be implemented with any suitable computing device, such as the computing device 800 of FIG. 8 and is described with reference to the system 100 of FIG. 1. For example, the method described below can be implemented by the solution generator 119 of FIG. 1.

At block 702, the solution generator receives extracted entities. For example, the extracted entities can include one or more attributes with values as described in FIGS. 2 and 3 above.

At block 704, the solution generator determines whether an appropriate model exists in model repository. For example, an appropriate model can be detected using metadata associated with each model in the model repository. In some examples, the metadata can include information such as when a model may be applied, which use cases the model can cover, among other information. The metadata can be used as key data to match a model with one or more extracted entities. For example, the solution generator can determine whether the appropriate model exists by mapping the list of entities to solution components and comparing the mapped solution components to solution components in existing models in the model repository. If the system detects that an appropriate model exists in the model repository, then the method may proceed at block 706. If the system detects that no appropriate model exists in the model repository, then the method may proceed at block 708.

At block 706, the solution generator fetches a model from the model repository. For example, the model repository can include models generated from past instances of the method. In some examples, the model repository can include open source models.

At block 708, the solution generator detects an appropriate training data set in a model repository based on classifications and extract entities. For example, each training set in the model repository may have associated metadata similar to the models. The metadata can be used to match training sets with one or more extracted entities. For example, the solution generator can detect an appropriate training data set by comparing training data metadata with the extracted list of entities.

At block 710, the solution generator generates a model based on training data set. The system can map the list of entities to one or more solution components. For example, the mining component of FIG. 4 above may correspond to an analytics model generated by the solution generator. In some examples, an algorithm can be already selected and "refreshed" with new training data. For example, the new training data may be more suitable for specific use case. In some examples, the algorithm may be in the form of a decision tree. In some examples, the algorithm may not be selected. In this case, the solution generator can train a number of supervised algorithms and then compare the performance of the trained algorithms.

At block 712, the solution generator generates streaming application analytics components by mapping the extracted entities to conceptual graphs and properties in the glossary. For example, the streaming application analytics components can include ingestion, filters, extraction, mining, and/or sink and visualization components, as in the example of FIG. 4 above, among other components.

At block 714, the solution generator generates a solution including the model. For example, the solution can include a mining component that corresponds to the model. In some examples, the solution can be simulated and modified. For example, the solution can be refined using a solution editor. In some examples, the solution generator can generate a solution by mapping the list of entities to one or more solution components.

The process flow diagram of FIG. 7 is not intended to indicate that the operations of the method 700 are to be executed in any particular order, or that all of the operations of the method 700 are to be included in every case. For example, if an appropriate model is detected at block 704, then blocks 708 and 710 may not be executed. Additionally, the method 700 can include any suitable number of additional operations.

Figure 8:
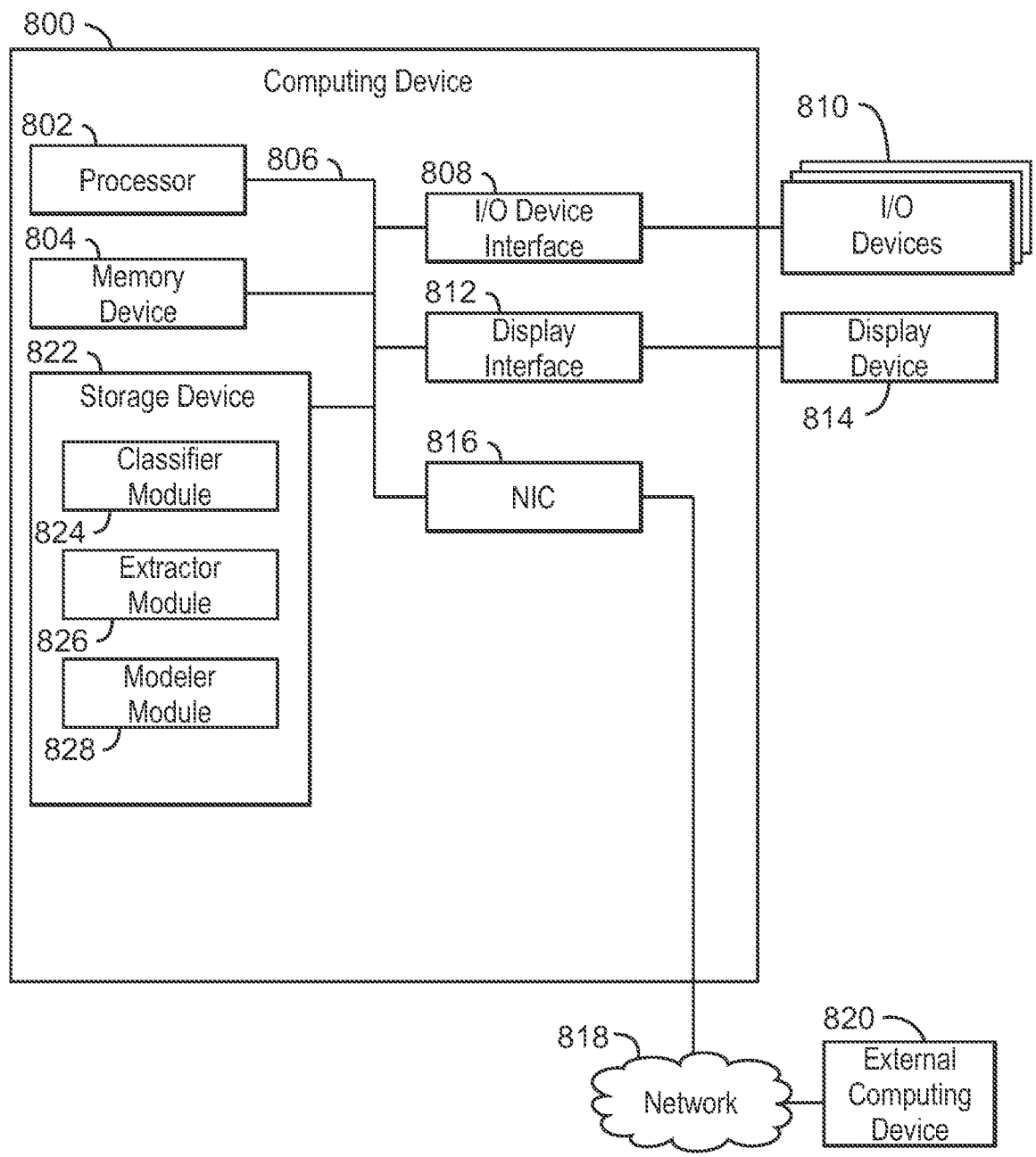
FIG. 8 is a block diagram of an example computing device that can generate streaming applications using a glossary.

FIG. 8 is block diagram of an example computing device that can generate streaming analytics applications. The computing device 800 may be for example, a server, desktop computer, laptop computer, tablet computer, or smartphone. In some examples, computing device 800 may be a cloud computing node. Computing device 800 may be described in the general context of computer system executable instructions, such as program modules, being executed by a computer system. Generally, program modules may include routines, programs, objects, components, logic, data structures, and so on that perform particular tasks or implement particular abstract data types. Computing device 800 may be practiced in distributed cloud computing environments where tasks are performed by remote processing devices that are linked through a communications network. In a distributed cloud computing environment, program modules may be located in both local and remote computer system storage media including memory storage devices.

The computing device 800 may include a processor 802 that is to execute stored instructions, a memory device 804 to provide temporary memory space for operations of said instructions during operation. The processor can be a single-core processor, multi-core processor, computing cluster, or any number of other configurations. The memory 804 can include random access memory (RAM), read only memory, flash memory, or any other suitable memory systems.

The processor 802 may be connected through a system interconnect 806 (e.g., PCI®, PCI-Express®, etc.) to an input/output (I/O) device interface 808 adapted to connect the computing device 800 to one or more I/O devices 810. The I/O devices 810 may include, for example, a keyboard and a pointing device, wherein the pointing device may include a touchpad or a touchscreen, among others. The I/O devices 810 may be built-in components of the computing device 800, or may be devices that are externally connected to the computing device 800.

The processor 802 may also be linked through the system interconnect 806 to a display interface 812 adapted to connect the computing device 800 to a display device 814. The display device 814 may include a display screen that is a built-in component of the computing device 800. The display device 814 may also include a computer monitor, television, or projector, among others, that is externally connected to the computing device 800. In addition, a network interface controller (NIC) 816 may be adapted to connect the computing device 800 through the system interconnect 806 to the network 818. In some embodiments, the NIC 816 can transmit data using any suitable interface or protocol, such as the internet small computer system interface, among others. The network 818 may be a cellular network, a radio network, a wide area network (WAN), a local area network (LAN), or the Internet, among others. An external computing device 820 may connect to the computing device 800 through the network 818. In some examples, external computing device 820 may be an external webserver. In some examples, external computing device 820 may be a cloud computing node.

The processor 802 may also be linked through the system interconnect 806 to a storage device 822 that can include a hard drive, an optical drive, a USB flash drive, an array of drives, or any combinations thereof. In some examples, the storage device may include a classifier module 824, an extractor module 826, and a modeler module 828. The classifier module 824 can receive subject matter requirements in a semi-structured format. For example, the subject matter requirements can include a plurality of constraints in a human-readable language. The classifier module 824 can classify the subject matter requirements based on a predefined taxonomy. For example, the predefined taxonomy can include one or more predefined categories composed of one or more words. The extractor module 826 can extract a list of entities based on grammar. For example, each entity can include an attribute and a value. The modeler module 828 can determine whether an appropriate model for the list of entities exists in a model repository. In some examples, the modeler module 828 can retrieve the appropriate model from the model repository if an appropriate model exists. For example, the modeler module 828 can use the appropriate model to generate a mining component. In some examples, the modeler module 828 can find an appropriate training data set in a model repository based on the classifications and the extracted entities. For example, the modeler module 828 can search for an appropriate training data set in response to not detecting any appropriate model in the model repository. The modeler module 828 can also include code to generate a model based on the training data set. For example, the training data set can include traffic representing benign and suspicious network traffic. The modeler module 828 can also generate a mining component based on the model. For example, the mining component can be used for streaming analytics. The modeler module 828 can then generate a streaming analytics application including the mining component. In some examples, when the computing device executes the streaming analytics application, the streaming analytics application can receive streaming analytics information and generate real-time output. For example, the output can be early warnings for earthquakes, epicenter locations, alarms indicating detected anomalies, among other kinds of output.

It is to be understood that the block diagram of FIG. 8 is not intended to indicate that the computing device 800 is to include all of the components shown in FIG. 8. Rather, the computing device 800 can include fewer or additional components not illustrated in FIG. 8 (e.g., additional memory components, embedded controllers, modules, additional network interfaces, etc.). Furthermore, any of the functionalities of the classifier 824, the extractor module 826, and the modeler module 828 may be partially, or entirely, implemented in hardware and/or in the processor 802. For example, the functionality may be implemented with an application specific integrated circuit, logic implemented in an embedded controller, or in logic implemented in the processor 802, among others. In some embodiments, the functionalities of the classifier module 824, extractor module 826, and modeler module 828 can be implemented with logic, wherein the logic, as referred to herein, can include any suitable hardware (e.g., a processor, among others), software (e.g., an application, among others), firmware, or any suitable combination of hardware, software, and firmware.

Figure 9:
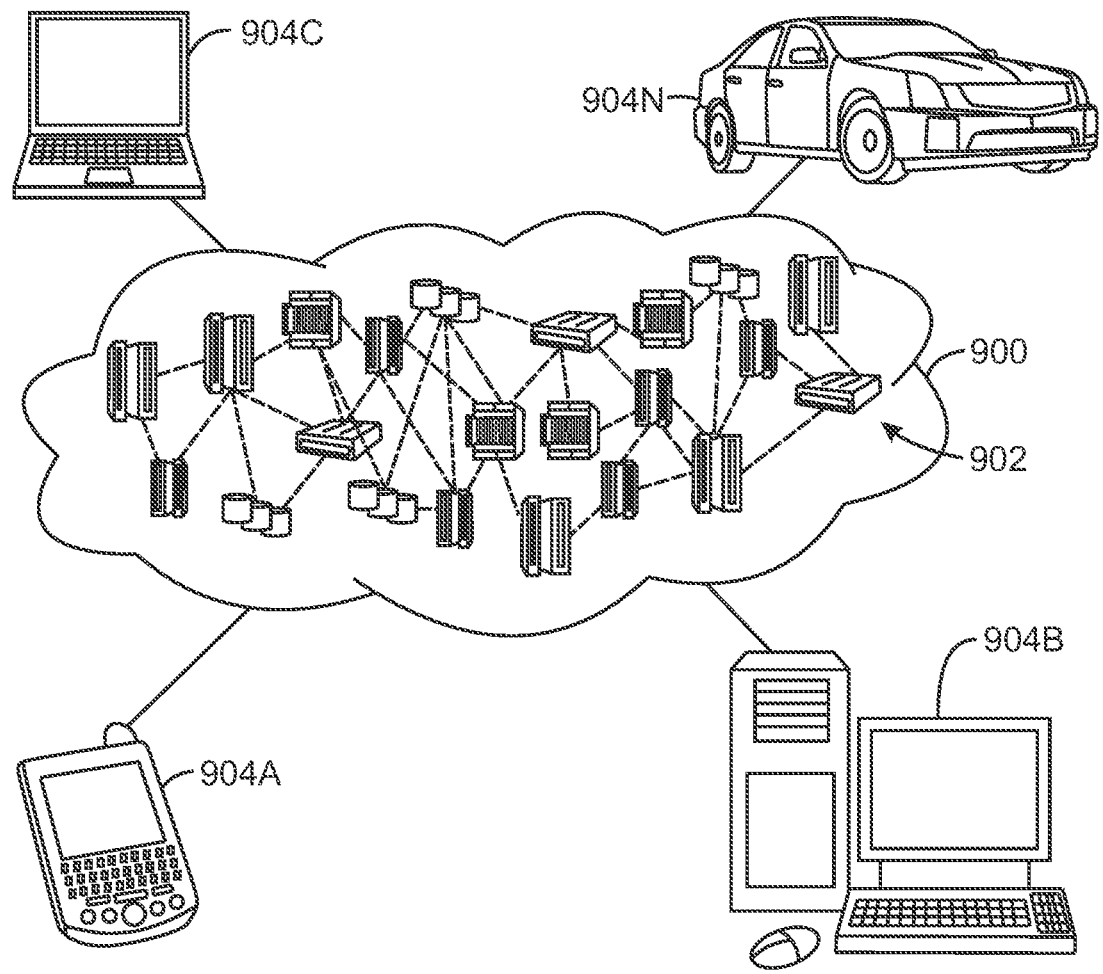
FIG. 9 is an example cloud computing environment according to embodiments described herein.

Referring now to FIG. 9, illustrative cloud computing environment 900 is depicted. As shown, cloud computing environment 900 comprises one or more cloud computing nodes 902 with which local computing devices used by cloud consumers, such as, for example, personal digital assistant (PDA) or cellular telephone 904A, desktop computer 904B, laptop computer 904C, and/or automobile computer system 904N may communicate. Nodes 902 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 904A-N shown in FIG. 9 are intended to be illustrative only and that computing nodes 902 and cloud computing environment 900 can communicate with any type of computerized device over any type of network and/or network addressable connection (e.g., using a web browser).

Figure 10:
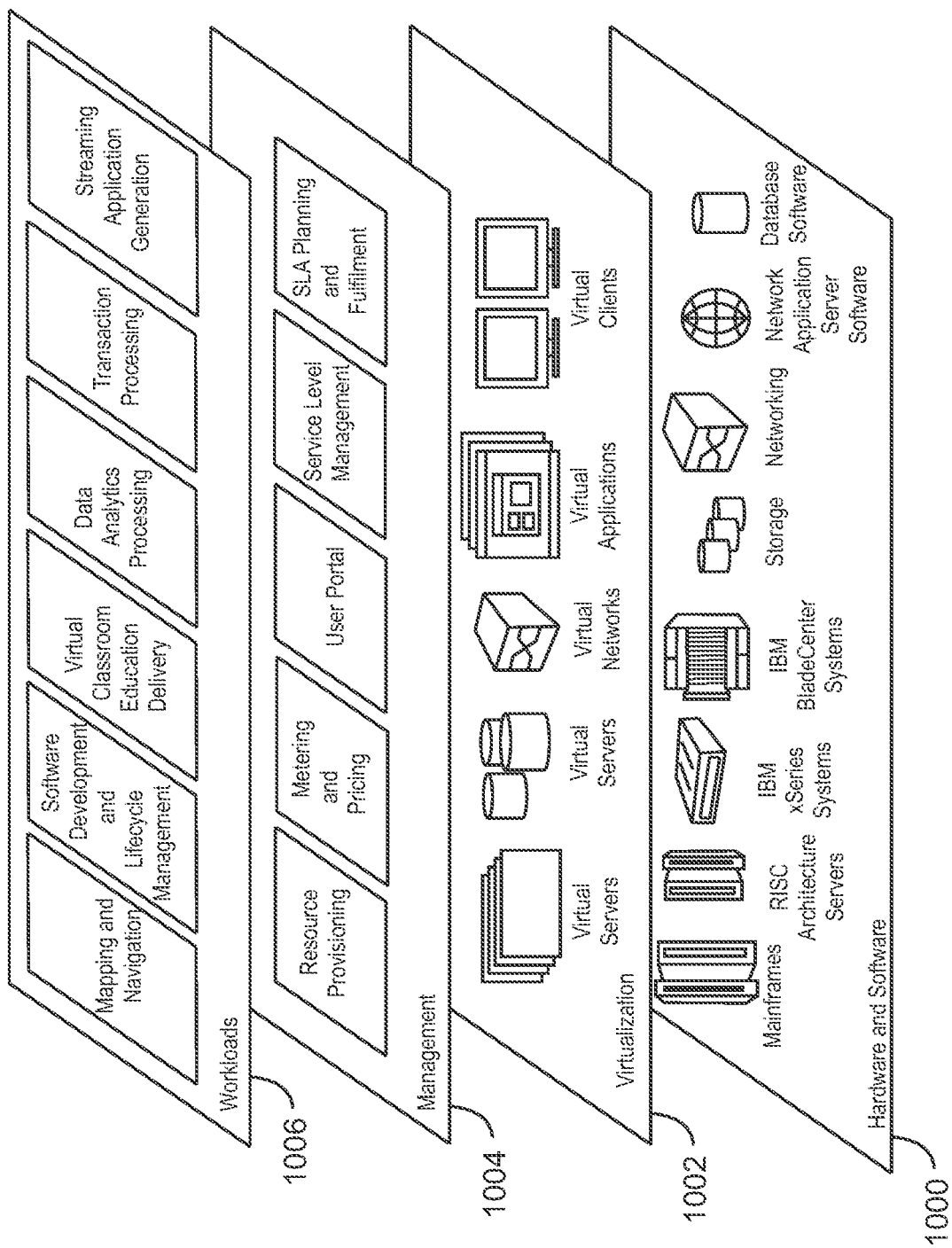
FIG. 10 is example abstraction model layers according to embodiments described herein.

Referring now to FIG. 10, a set of functional abstraction layers provided by cloud computing environment 900 (FIG. 9) is shown. It should be understood in advance that the components, layers, and functions shown in FIG. 10 are intended to be illustrative only and embodiments of the invention are not limited thereto. As depicted, the following layers and corresponding functions are provided.

Hardware and software layer 1000 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1002 provides an abstraction layer from which the following examples of virtual entities may be provided: virtual servers; virtual storage; virtual networks, including virtual private networks; virtual applications and operating systems; and virtual clients. In one example, management layer 1004 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1006 provides examples of functionality for which the cloud computing environment may be utilized. Examples of workloads and functions which may be provided from this layer include: mapping and navigation; software development and lifecycle management; virtual classroom education delivery; data analytics processing; transaction processing; and streaming application generation.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 11:
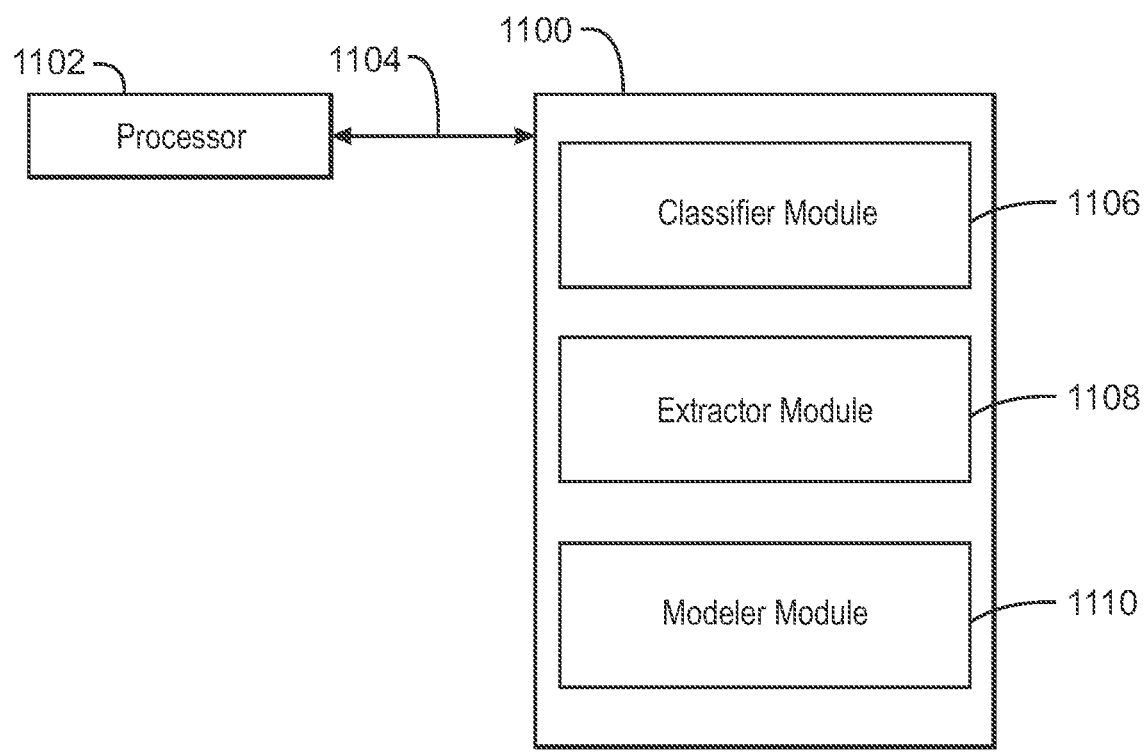
FIG. 11 is an example tangible, non-transitory computer-readable medium that can generate streaming applications using a glossary.

Referring now to FIG. 11, a block diagram is depicted of an example tangible, non-transitory computer-readable medium 1100 that can generate streaming applications using a glossary. The tangible, non-transitory, computer-readable medium 1100 may be accessed by a processor 1102 over a computer interconnect 1104. Furthermore, the tangible, non-transitory, computer-readable medium 1100 may include code to direct the processor 1102 to perform the operations of the method 600 of FIG. 6 above.

The various software components discussed herein may be stored on the tangible, non-transitory, computer-readable medium 1100, as indicated in FIG. 11. For example, a classifier module 1106 includes code to receive subject matter requirements in a semi-structured format. The classifier module 1106 also includes code to classify the subject matter requirements based on a predefined taxonomy. An extractor module 1108 includes code to extract a list of entities from the subject matter requirements based on a glossary. A modeler module 1110 includes code to detect an appropriate training data set in a model repository based on the classifications and the extracted entities. The modeler module 1110 also includes code to generate a model based on the training data set. The modeler module 1110 also includes code to generate a streaming analytics application based on the model. For example, the modeler 1110 can include code to fetch the model from the model repository and generate the streaming analytics application based on the model. The modeler module 1110 can also include code to generate a streaming analytics application comprising a mining component. In some examples, an appropriate model may already exist in the model repository. The modeler module 1110 can include code to detect an existing model in a model repository. The modeler module 1110 can then generate the streaming analytics application based on the existing model in the model repository.

In some examples, the modeler module 1110 can include code to map the list of entities to solution components and compare the mapped solution components to solution components in existing models in the model repository. In some examples, the modeler module 1110 can include code to detect that an operator does not exist and send a task generation request to a user interface. In some examples, the modeler module 1110 can receive feedback from a subject matter expert and modify the streaming analytics application based on the feedback. It is to be understood that any number of additional software components not shown in FIG. 11 may be included within the tangible, non-transitory, computer-readable medium 1100, depending on the particular application.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 11 may be included within the tangible, non-transitory, computer-readable medium 1100, depending on the specific application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, classifier modules, extractor modules, modeler modules, etc.). These systems may include any types of monitors and input devices (e.g., keyboard, mouse, voice recognition, etc.) to enter and/or view information.

It is to be understood that the software (e.g., classifier selection modules, extractor modules, modeler modules, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., classifier modules, extractor modules, modeler modules, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., taxonomy data, glossary data, knowledge database data, models/training data, default/user-defined inputs, etc.). The database system may be implemented by any number of any conventional or other databases, data stores or storage structures (e.g., files, databases, data structures, data or other repositories, etc.) to store information (e.g., taxonomy data, glossary data, knowledge database data, models/training data, default/user-defined inputs, etc.). The database system may be included within or coupled to the server and/or client systems. The database systems and/or storage structures may be remote from or local to the computer or other processing systems, and may store any desired data (e.g., taxonomy data, glossary data, knowledge database data, models/training data, default/user-defined inputs, etc.).

The present invention embodiments may employ any number of any type of user interface (e.g., Graphical User Interface (GUI), command-line, prompt, etc.) for obtaining or providing information (e.g., taxonomy data, glossary data, knowledge database data, models/training data, default/user-defined inputs, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for determining an option for any activity between the participants by analyzing the preferences, limitations, and capabilities of each of the participants.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
    a processor configured to:
        receive subject matter requirements in a semi-structured format;
        classify the subject matter requirements based on a predefined taxonomy;
        extract a list of entities from the subject matter requirements based on grammar;
        generate a solution based on a glossary, wherein to generate the solution the processor is further configured to:
            detect a training data set in a model repository based on the classifications and the extracted entities,
            generate a model based on the training data set, and
            map the extracted entities to at least one streaming analytics application functional component, wherein the solution includes the model and the at least one streaming analytics application functional component; and
        generate a streaming analytics application for a stream computing platform in real-time based on the solution, wherein the streaming analytics application includes the model and the at least one streaming analytics application functional component.

2. The system of claim 1, wherein to generate the solution, the processor is further configured to generate the at least one streaming analytics application component by mapping the extracted entities to conceptual graphs and properties in the glossary.

3. The system of claim 1, wherein the subject matter requirements comprise a plurality of constraints in a human-readable language.

4. The system of claim 1, wherein the glossary comprises a predefined glossary of an organization.

5. The system of claim 1, wherein the training data set comprises classified training data.

6. The system of claim 1, wherein the predefined taxonomy comprises predefined categories comprising words.

7. The system of claim 1, wherein the processor is further configured to determine whether an applicable model associated with the extracted entities exists in the model repository and fetch the applicable model from the model repository when the applicable model exists, the applicable model to be included in the streaming analytics application.

8. A computer-implemented method, comprising:
    receiving, via a processor, subject matter requirements in a semi-structured format;
    classifying, via the processor, the subject matter requirements based on a predefined taxonomy;
    extracting, via the processor, a list of entities from the subject matter requirements based on grammar;
    generating, via the processor, a solution based on a glossary by detecting a training data set in a model repository based on the classifications and the extracted entities, generating a model based on the training data set, and mapping the extracted entities to at least one streaming analytics application functional component, wherein the solution includes the at least one streaming analytics application functional component and the model; and
    generating, via the processor, a streaming analytics application for a stream computing platform in real-time based on the solution, wherein the streaming analytics application includes the at least one streaming analytics application functional component and the model.

9. The computer-implemented method of claim 8, further comprising:
    generating, via the processor, the at least one streaming analytics application functional component by mapping the extracted entities to conceptual graphs and properties in the glossary.

10. The computer-implemented method of claim 8, further comprising scoring solutions based on metadata comparisons and returning a set of solutions with a higher score.

11. The computer-implemented method of claim 8, further comprising:
determining, via the processor, whether an applicable model associated with a second list of entities extracted from second subject matter requirements exists in the model repository, wherein determining whether the applicable model exists comprises mapping the second list of entities to solution components and comparing the mapped solution components to solution components of models existing in the model repository;
fetching, via the processor, the applicable model from the model repository when the applicable model is detected; and
generating, via the processor, a second streaming analytics application based on the applicable model fetched from the model repository.

12. The computer-implemented method of claim 8, wherein detecting a training data set comprises comparing training data metadata with the extracted list of entities.

13. The computer-implemented method of claim 8, further comprising receiving feedback from a subject matter expert and updating a streaming analytics application conceptual graph in the glossary based on the feedback.

14. A computer program product for generating streaming analytics applications, the computer program product comprising:
one or more computer-readable non-transitory storage media collectively having program code embodied therewith, the program code executable by a processor to cause the processor to:
receive subject matter requirements in a semi-structured format;
classify the subject matter requirements based on a predefined taxonomy;
extract a list of entities from the subject matter requirements based on grammar;
generate a solution based on a glossary, wherein generating the solution comprises:
detecting a training data set in a model repository based on the classifications and the extracted entities;
generating a model based on the training data set; and
mapping the extracted entities to at least one streaming analytics application functional component including a mining component, wherein the solution includes the model and the at least one streaming analytics application functional component including the mining component; and
generate a streaming analytics application for a stream computing platform in real-time based on the solution, wherein the streaming analytics application includes the model and the at least one streaming analytics application functional component including the mining component.

15. The computer program product of claim 14, further comprising program code executable by the processor to:
detect an existing model in the model repository associated with a second list of entities extracted from second subject matter requirements; and
generate a second streaming analytics application based on the existing model in the model repository.

16. The computer program product of claim 15, further comprising program code executable by the processor to map the second list of entities to solution components and compare the mapped solution components to solution components of models existing in the model repository.

17. The computer program product of claim 14, further comprising program code executable by the processor to detect that an operator does not exist and send a task generation request to a user interface.

18. The computer program product of claim 14, further comprising program code executable by the processor to receive feedback from a subject matter expert and modify the streaming analytics application based on the feedback.

19. The computer program product of claim 15, further comprising program code executable by the processor to fetch the existing model from the model repository and generate a second mining component based on the existing model.

* * * * *